(12) United States Patent
Bouvier et al.

(10) Patent No.: US 9,902,418 B2
(45) Date of Patent: Feb. 27, 2018

(54) ADJUSTABLE STEERING COLUMN MECHANISM WITH ANTITHEFT LOCK

(71) Applicant: Robert Bosch Automotive Steering Vendôme, Vendôme (FR)

(72) Inventors: Eric Bouvier, Vendôme (FR); Patrick Campos, Tours (FR); Loïc Villaume, Vendôme (FR)

(73) Assignee: Robert Bosch Automotive Steering Vendome, Vendome (FR)

( * ) Notice: Subject to any disclaimer, the term of this patent is extended or adjusted under 35 U.S.C. 154(b) by 18 days.

(21) Appl. No.: 14/841,026

(22) Filed: Aug. 31, 2015

(65) Prior Publication Data

US 2016/0059880 A1    Mar. 3, 2016

(30) Foreign Application Priority Data

Aug. 29, 2014 (FR) ..................... 14 58117

(51) Int. Cl.
*B62D 1/185* (2006.01)
*B62D 1/16* (2006.01)
*B60R 25/021* (2013.01)

(52) U.S. Cl.
CPC .......... *B62D 1/185* (2013.01); *B60R 25/0211* (2013.01); *B62D 1/16* (2013.01)

(58) Field of Classification Search
CPC ........ B62D 1/185; B62D 1/16; B60R 25/0211
See application file for complete search history.

(56) References Cited

U.S. PATENT DOCUMENTS

| 6,598,393 B2 * | 7/2003 | Riefe ................. B60R 25/02 180/287 |
| 2006/0272370 A1 * | 12/2006 | Yamada ............ B60R 25/02107 70/186 |
| 2009/0056394 A1 * | 3/2009 | Tsunoda ............... B60R 21/045 70/209 |

(Continued)

FOREIGN PATENT DOCUMENTS

| DE | 19809294 A | 9/1999 |
| EP | 1426255 A | 6/2004 |
| EP | 1728696 A | 12/2006 |

OTHER PUBLICATIONS

Search report from French Patent Office (INPI) for priority application FR 1458117 dated May 11, 2015.

*Primary Examiner* — Faye M Fleming
(74) *Attorney, Agent, or Firm* — Haug Partners LLP

(57) ABSTRACT

A steering column mechanism a movable subassembly including a tube body and a steering shaft rotating around an rotation axis in the tube body, and a connecting articulation between the movable subassembly and a fixed support to guide pivoting of the movable subassembly relative to the fixed support around a pivot axis perpendicular to the rotation axis. An antitheft locking mechanism includes a locking body that is movable relative to the fixed support between a retracted position and at least one locking position and a matching member mounted on the shaft. In the locking position, the locking member ensures with the matching member positive locking to lock the rotation of the steering shaft. The locking member and the matching member have, in the locking position, a mutual contact zone which, in reference to a direction parallel to the rotation axis, extends on either side of the pivot axis.

24 Claims, 6 Drawing Sheets

(56) References Cited

U.S. PATENT DOCUMENTS

2010/0242665 A1    9/2010   Nagamura et al.
2012/0234127 A1*   9/2012   Okano ................... B62D 1/184
                                                                            74/493

* cited by examiner

ADJUSTABLE STEERING COLUMN MECHANISM WITH ANTITHEFT LOCK

TECHNICAL FIELD OF THE INVENTION

The invention generally relates to a steering mechanism with an adjustable height by tilting around a pivot axis. It more specifically relates to a lock for the rotation of the shaft of such a mechanism to perform an antitheft function.

BACKGROUND OF THE INVENTION

In order to lock a steering shaft of a steering column so as to prevent unauthorized use of the vehicle, it is possible to use a lock including a locking member guided, relative to a structure fixed in rotation, between a retracted position and a locking position in which it performs positive locking with a matching member connected in rotation to the steering column, to prevent the steering column integral with the steering wheel from rotating.

When the height of the steering column is adjustable by tilting around a transverse horizontal pivot axis perpendicular to the axis of rotation of the steering shaft, the locking member is most often mounted so as to follow the tilting movement. In practice, the steering shaft is mounted in a tube body, which provides guiding of the steering shaft in rotation around its axis, and which in turn is articulated to a fixed bracket so as to ensure the desired tilting movement around the pivot axis. The lock is then integrated into the tube body. This arrangement of the lock increases the mass of the moving part of the steering column, increases its bulk and requires electric control cables long enough to follow the tilting movement of the moving part. To resolve these problems, it has been proposed in document DE 198 09 294 to position the lock on a fixed bracket. In the case at hand, the locking member is made up of a bolt and the matching member of a toothed crown supported by the steering shaft. The end of the bolt is curved, to ensure satisfactory engagement in the toothed crown in the locking position, irrespective of the incline of the steering column.

However, this arrangement is only satisfactory for small angular variations during tilting of the shaft, since for larger variations, the bolt risks escaping from the toothed crown. In practice, it has been abandoned and is implemented little or not at all.

BRIEF DESCRIPTION OF THE INVENTION

The invention aims to resolve the drawbacks of the prior art and to propose a steering column mechanism with at least an adjustable height, if applicable allowing considerable travel between the lower position and the upper position, and provided with a locking member that is inaccessible during attempts to steal the vehicle.

To that end, a steering column mechanism is proposed including: a fixed support provided with means for fastening to a superstructure of a vehicle; a movable subassembly including a tube body and a steering shaft rotating around an axis of rotation in the tube body; a connecting articulation for connecting the movable subassembly with the fixed support, to guide pivoting of the movable subassembly relative to the fixed support around a pivot axis fixed relative to the fixed support and perpendicular to the axis of rotation; and an antitheft locking mechanism including a locking body that is movable relative to the body between a retracted position and at least one locking position and a matching member mounted on the shaft, such that in the locking position, the locking member ensures, with the matching member, positive locking to lock the rotation of the shaft around the rotation axis, the locking member and the matching member having, in the locking position, a mutual contact zone which, in reference to a direction parallel to the rotation axis, extends on either side of the pivot axis.

The relative arrangement of the locking member and the pivot axis minimizes the position variations of the matching member relative to the locking member in the locking position, when the pivot angle of the movable subassembly varies, even over significant variation ranges. It is therefore possible, even in the case of a steering column with a significant tilt angle, to position the antitheft locking mechanism in the fixed support, which is a relatively inaccessible part during break-in attempts.

According to one embodiment, the locking member is movable between the retracted position and the locking position parallel to a plane containing the axis of rotation.

The locking member can be translatable relative to the fixed support following a penetration axis perpendicular to the pivot axis and/or perpendicular to the rotation axis. Alternatively, the locking member can be rotatable relative to the fixed support.

Advantageously, the articulation may include two coaxial pivots situated on either side of the steering shaft, each of the two pivots including a part integral with the tube body. The forces potentially resulting from the interaction between the locking member and the matching member are then not fully compensated by the pivots, situated on either side of the locking member.

Preferably, the axis of rotation and the pivot axis are secant, such that there is a fixed point during the pivoting of the movable subassembly around the pivot axis, which is situated on the axis of rotation.

According to one embodiment, the locking member includes a translatable bolt or a rotatable latch, and the matching member is a crown mounted on the steering shaft, if applicable by means of a torque limiter, preferably an allowance ring. The crown has teeth that delimit splines preferably extending parallel to the axis of rotation.

The steering shaft is secured in rotation to the steering wheel. Its length may be fixed or adjustable in terms of depth, and in that case it constitutes a telescopic shaft including at least one first segment preferably fixed in translation parallel to the axis of rotation relative to the fixed support, and a second support segment of a steering wheel, the second segment being translatable relative to the first segment parallel to the rotation axis, the matching member being mounted on the first segment.

The antitheft locking mechanism preferably includes an actuator, preferably electromechanical, to drive the locking member between the retracted position and the locking position.

In order to offset the small positioning variations between the locking member and the matching member, the locking member may have a curved free end.

BRIEF DESCRIPTION OF THE FIGURES

Other features and advantages of the invention will emerge from reading the following description, in reference to the appended figures, which illustrate.

For better clarity, identical or similar elements are identified using identical reference signs in all of the figures.

DETAILED DESCRIPTION OF THE INVENTION

Figure 1:
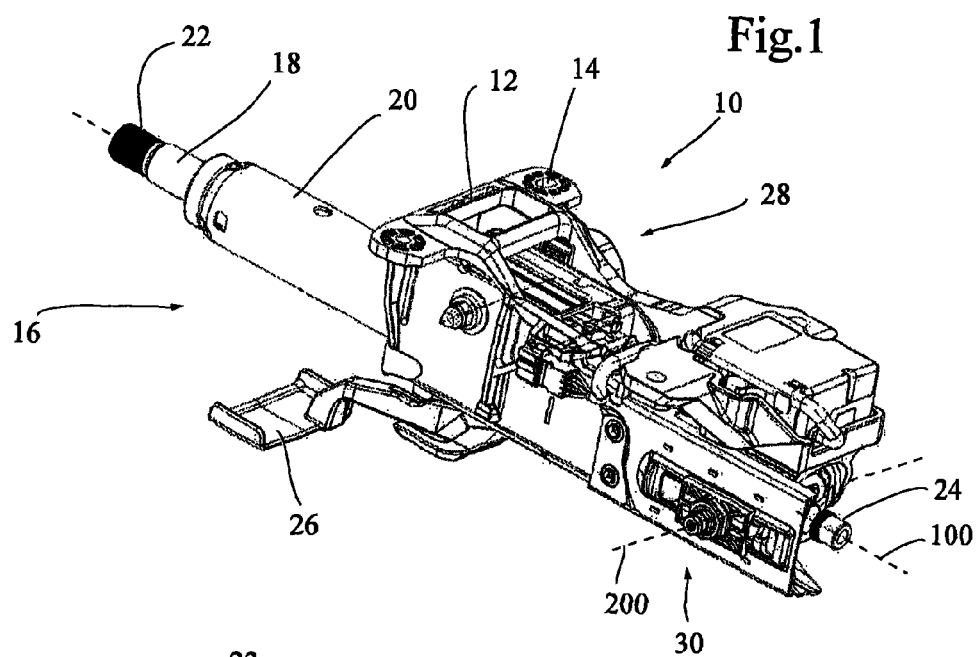
FIG. 1 is an isometric view of a steering column mechanism according to one embodiment of the invention.

FIG. 1 shows a steering column mechanism 10 including a fixed support 12 provided with a fastening interface 14, for its fastening to the superstructure of a motor vehicle, and a movable subassembly 16 including a steering shaft 18 rotating around a steering axis 100 inside a tube body 20. A rear end 22 of the shaft 18 is designed to receive a steering wheel (not shown), while a front end 24 acts, directly or indirectly, for example by means of a rack, with or without assistance, on a steering station connected to the drive wheels of the vehicle, so as to transmit the rotation from the steering wheel to the drive wheels.

In a known manner, the tube body 20 pivots relative to the fixed support 12 around a horizontal pivot axis 200 perpendicular to the steering axis 100 to allow the driver, by acting on a lever 26 of an adjustment mechanism 28, to release the tube body 20 in order to position it in a desired angular position around the pivot axis 200 and thereby adjust the height of the steering wheel, then lock the tube body 20 in that position. In order to produce the pivot link between the tube body 20 and the support 12, an articulation 30 is formed by providing a stud 32 screwed into the support 12, and the end of which constitutes a journal 32.1 rotating in a bearing 33 formed by the tube body 20, on one side, and on the opposite side, a stud 34 screwed into a threaded insert 35 overmolded in the tube body 20 and guided in rotation around the axis 200 relative to the fixed support 12 using a bushing 36. The pivot axis 200 and rotation axis 100 are secant and perpendicular to one another. The pivot axis 200 is situated in the immediate vicinity of the front end 24 of the steering shaft, so as to minimize the angular travel of the front end 24 of the shaft during height adjustments of the steering wheel.

Figure 2:
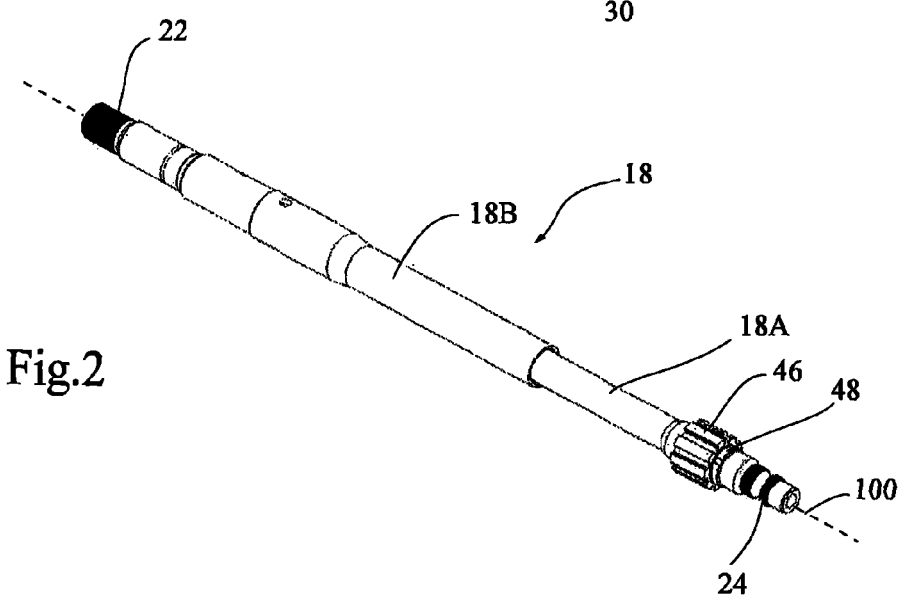
FIG. 2 is an isometric view of a steering shaft of the steering column mechanism of FIG. 1.
Figure 3:
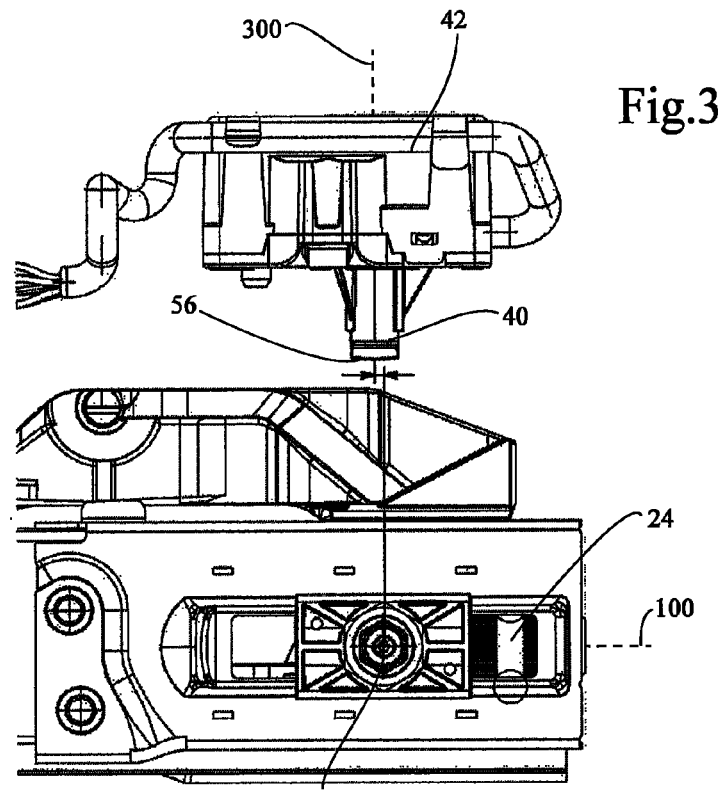
FIG. 3 is an exploded side view of a fixed support bracket of the steering column mechanism of FIG. 1.

If applicable, and as illustrated in FIG. 2, the steering shaft 18 can include two parts 18A, 18B secured to one another in rotation around the steering axis, but able to slide relative to one another, for example in one another, parallel to the steering axis 100, to allow depth adjustment of the position of the rear end 22 of the steering shaft, connected to the steering wheel. The rear part 18B of the shaft, secured to the steering wheel, is then movable, while the position of the front part 18A of the shaft, the end 24 of which is connected to the steering station, is not affected by the depth adjustments. In a known manner, the same adjustment mechanism 28 ensures height and depth blocking.

Figure 4:
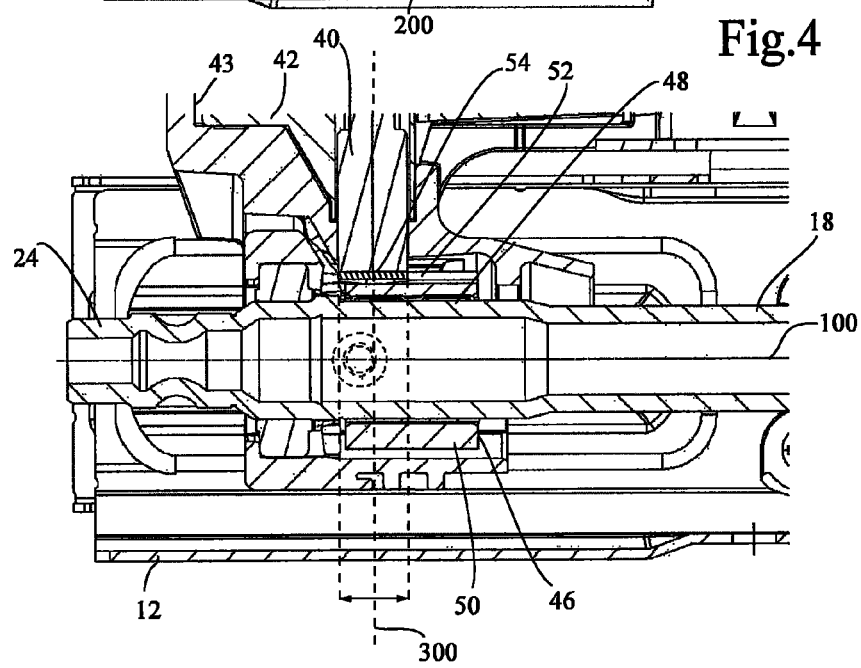
FIG. 4 is an axial sectional view of a detail of the fixed support bracket of FIG. 3 in a locked position of an antitheft locking mechanism and in a median angular position of the steering column mechanism.
Figure 5:
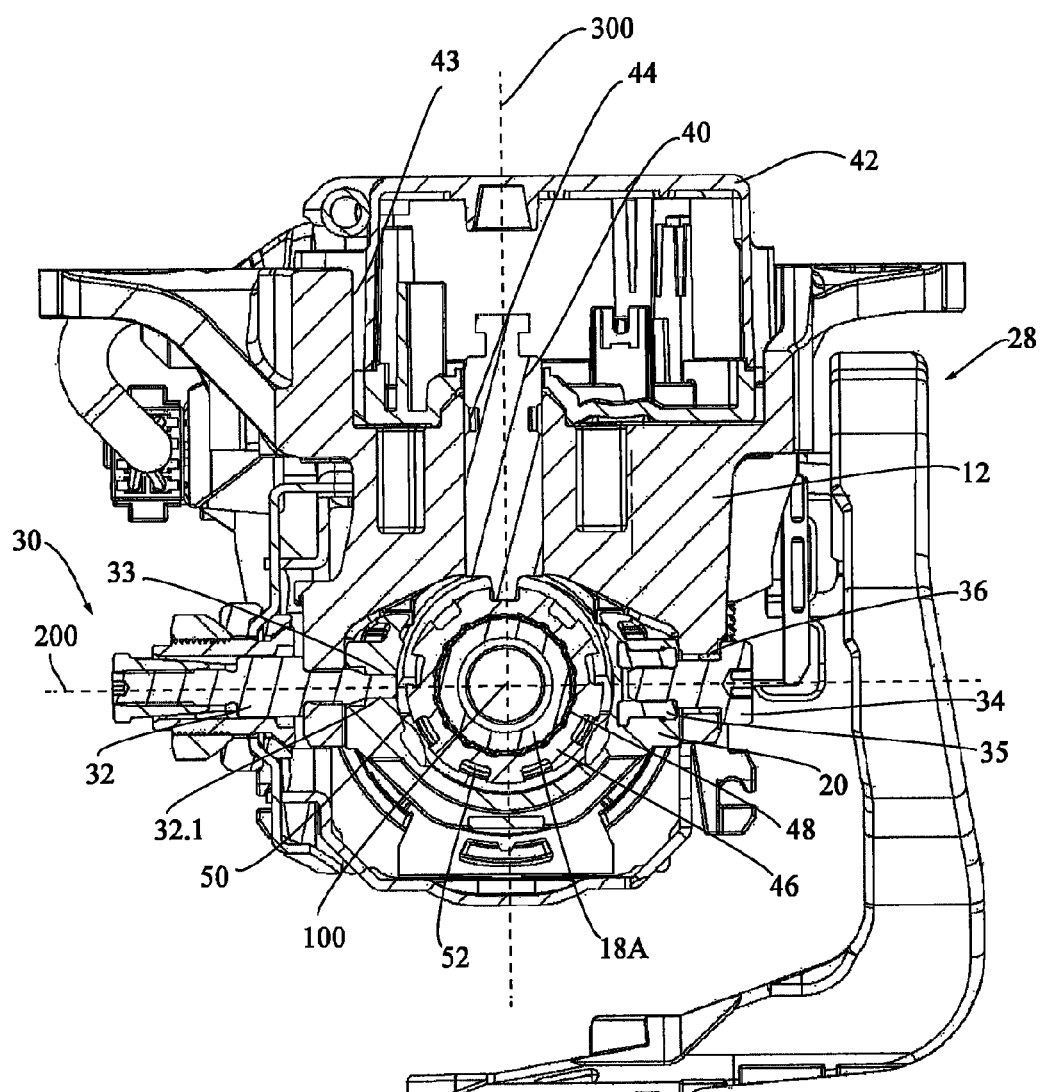
FIG. 5 is a cross-sectional view of a detail of the fixed support bracket of FIG. 3 in the locked position of the antitheft locking mechanism and in the median angular position of the steering column mechanism.
Figure 6:
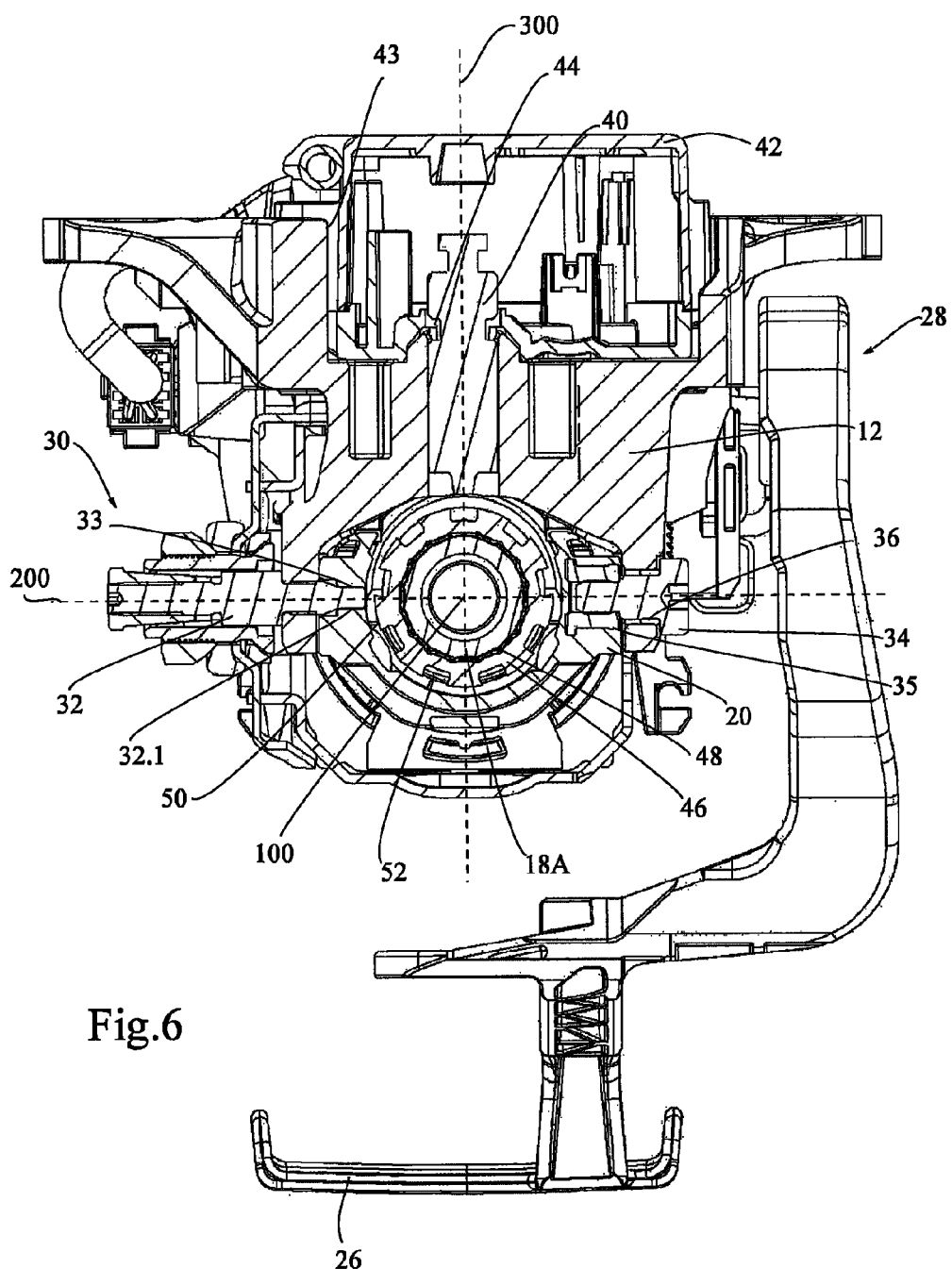
FIG. 6 is a cross-sectional view of a detail of the fixed support bracket of FIG. 3 in an unlocked position of the antitheft locking mechanism and in the median angular position of the steering column mechanism.

The tube body 20 is open in the zone of the pivot axis 200, to allow the passage of a bolt 40 of an antitheft locking mechanism 42, illustrated in FIGS. 3 to 8, at least partially housed between walls 43 of the tube body 20. A, bolt here refers to a locking member 40 able to be translated, preferably parallel to an axis 300 perpendicular to the rotation axis 100 and pivot axis 200, between a retracted position and a locking position. The bolt 40 can interact, through an opening 44 of the support 12 and the corresponding opening of the tube body 20, with a toothed crown 46 mounted on the front part 18A of the steering shaft. The toothed crown 46 can be secured in rotation with the steering shaft 18, or preferably can be connected to the steering shaft 18 by means of an allowance ring 48 serving to limit torque by guaranteeing a rotational connection when the torque is below a given threshold, but allowing a free rotation above that threshold. The toothed crown 46 has teeth 50 that delimit indentations 52 spaced on its circumference, each of the indentations 52 being oriented radially, to allow the bolt 40 to penetrate them, if it is located opposite and maneuvered in the locking position, as illustrated in FIG. 5.

Figure 7:
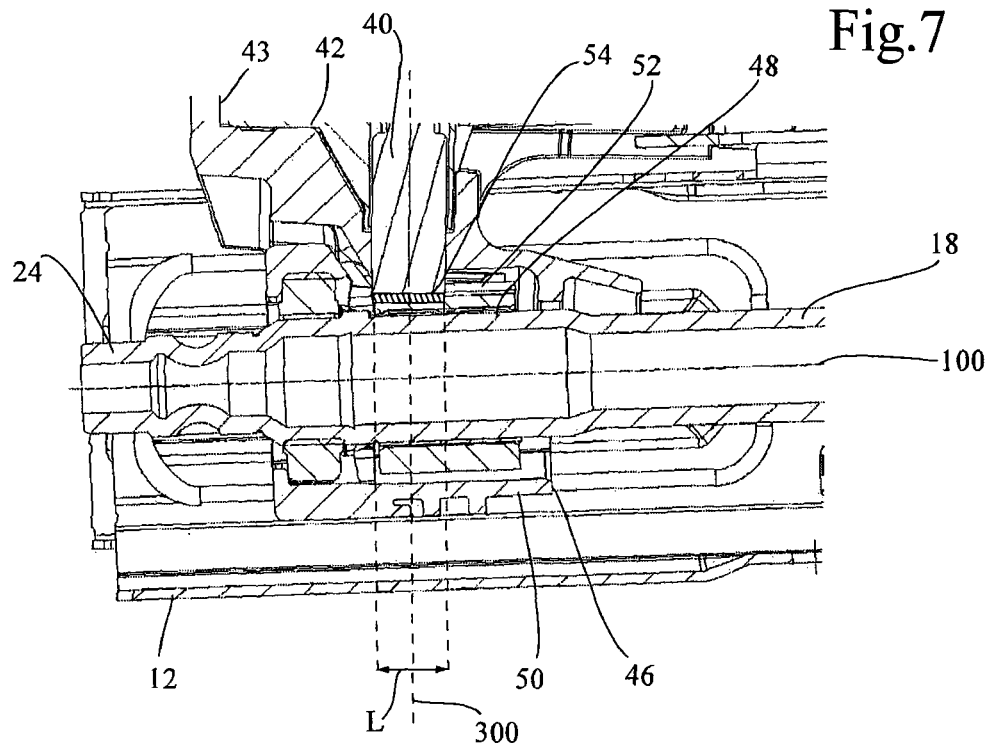
FIG. 7 is an axial sectional view of a detail of the fixed support bracket of FIG. 3 in the locked position of the antitheft locking mechanism and in an upper angular position of the steering column mechanism.
Figure 8:
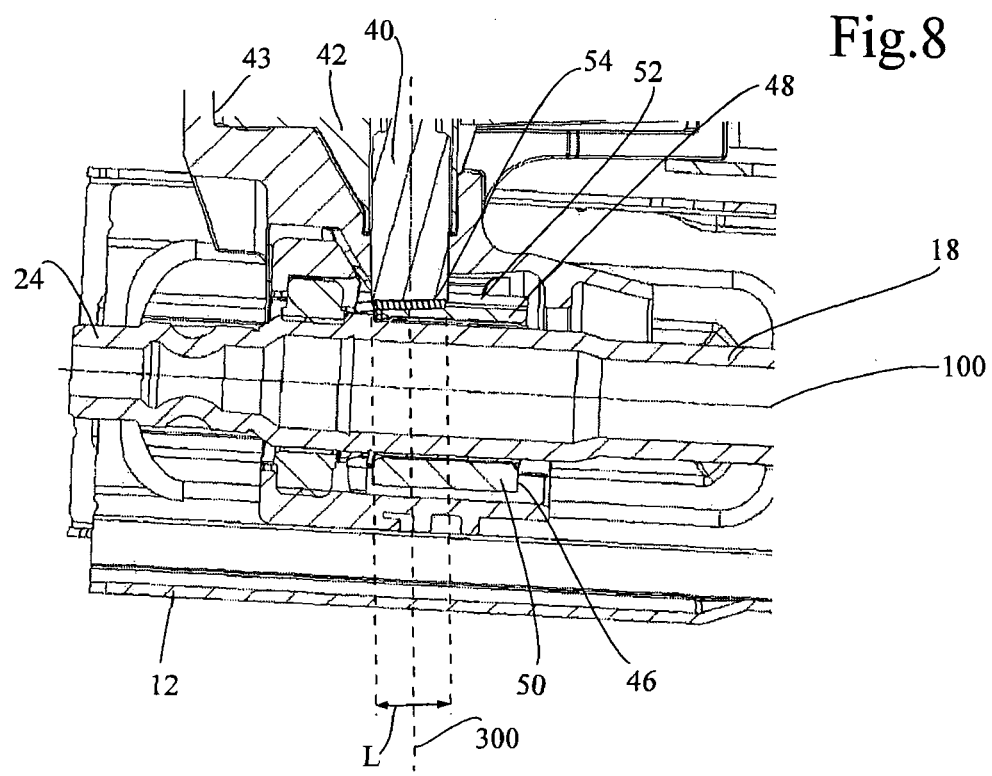
FIG. 8 is an axial sectional view of a detail of the fixed support bracket of FIG. 3 in the locked position of the antitheft locking mechanism and in a lower angular position of the steering column mechanism.

In a known manner, the antitheft locking mechanism 42 includes an electromechanical actuator (not shown) to drive the bolt 40 in translation. Preferably, and in a known manner, the bolt 40 retains limited translational movement freedom relative to the actuator, and is biased toward the locking position by a return spring. Thus, in case of an unlocking command, the actuator 42 drives the bolt 40 in the position of FIG. 6, whereas in case of a locking command, the actuator 42 drives the bolt 40 toward the locking position of FIG. 5 if the bolt is located across from one of the indentations 52, or bearing against one of the teeth 50 of the crown 46 otherwise. In the latter hypothesis, a slight rotation of the steering wheel will lead the bolt 40, biased by the return spring, to penetrate the first indentations 52 encountered to ensure the desired locking. In the locking position, when the protruding end of the bolt 40 has penetrated an indentation 52 between two teeth 50 of the toothed crown 46, locking is obtained by lateral contact of the bolt 40 against the lateral surfaces of the two adjacent teeth 50 delimiting the indentation 52. It is thus possible to define, between the bolt 40 and each of the teeth 50, a contact surface 54 which, to ensure good locking, must be large enough. Remarkably, this contact surface 54 extends, in a direction parallel to the rotation axis 100, on either side of the pivot axis 200, over the entire width L of the bolt 40. As illustrated in FIGS. 4, 7 and 8, and deliberately amplified and shown diagrammatically in FIGS. 9, 10 and 11, this relative positioning of the contact surface 54 and the pivot axis 200 makes it possible to ensure locking independently of the angular position of the movable subassembly 16, even for large pivot angles of the tube body 20 around the pivot axis 200.

Figure 9:
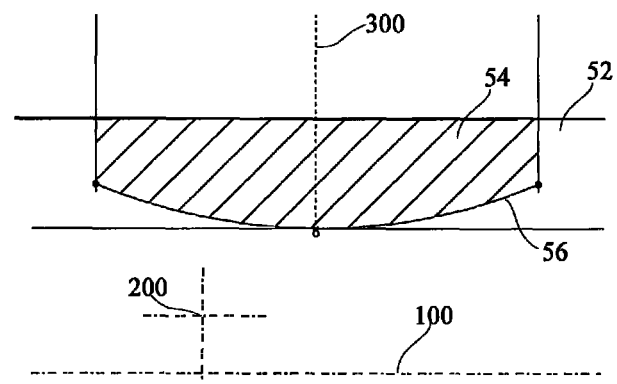
FIG. 9 is a diagrammatic view of the antitheft locking mechanism in the median position of FIG. 4.
Figure 10:
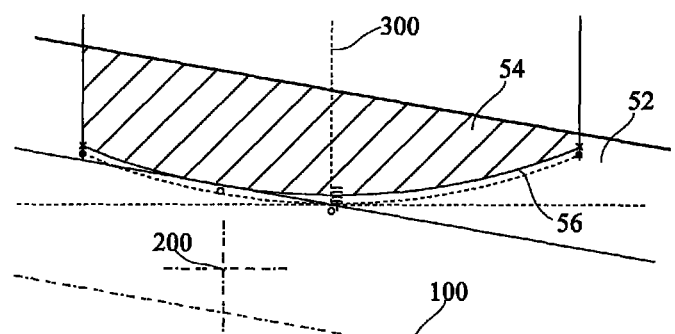
FIG. 10 is a diagrammatic view of a detail of the antitheft locking mechanism in the upper angular position of FIG. 7.
Figure 11:
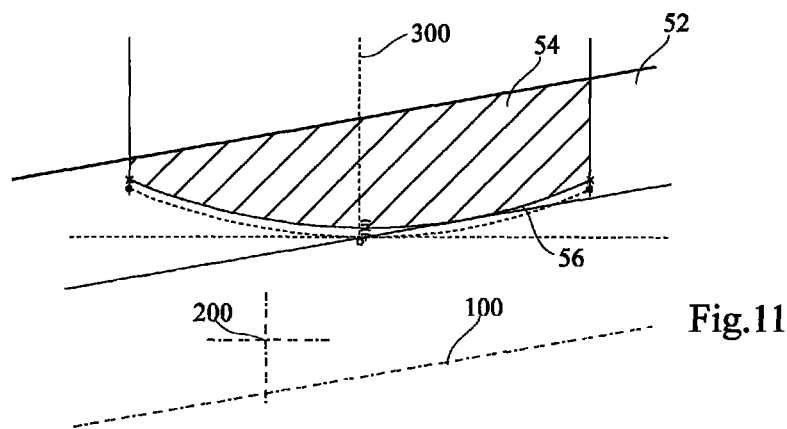
FIG. 11 is a diagrammatic view of a detail of the antitheft locking mechanism in the lower angular position of FIG. 8.

The protruding end of the bolt 40 has a curved surface 56 that is substantially cylindrical with a curve axis 400 parallel to the pivot axis and situated opposite the pivot axis 200 relative to the curved surface 56. Preferably, the curve radius of that curved surface 56 is defined such that, during radial adjustment of the column, the authorized vertical movement of the bolt 40 does not exceed 5%, and preferably 2%, of the engaged height defined in the normal position, as illustrated in FIGS. 9 to 11. One thus ensures a penetration depth of the bolt 40 in the indentation 52 that is always sufficient, irrespective of the angular position of the movable subassembly 16, which contributes to good locking.

When the vehicle is stopped and parked and the locking conditions for the rotation of the steering shaft 18 are met, for example when a contact key has been removed from the corresponding barrel, or an electronic contactless key is missing, the antitheft locking mechanism commands the movement of the bolt 40, which becomes positioned either in an indentation 52, or on a tooth 50, but so as to penetrate an indentation once a rotation of the steering wheel begins. When the bolt 40 is engaged with an indentation 52, the contact surfaces 54 are sufficient to guarantee positive locking, irrespective of the angle of the movable subassembly 16. In the locking position, the steering shaft 18 remains immobilized in rotation inasmuch as the torque applied remains below the torque threshold defined by the allowance ring 48. The torque threshold is chosen such that it is low enough to guarantee that no parts will be broken, and high enough that it is not possible to drive the vehicle.

The pivot axis 200 is situated away from the rear end 22 of the tube body, preferably at a distance exceeding 20 cm. It is thus possible to house the part of the tube body receiving the locking mechanism 42 below the dashboard of the vehicle, so as not to be accessible to a thief.

Of course, various modifications are possible. The translatable bolt can be replaced by a latch catch preferably pivoting in a plane containing the rotation axis between a retracted position and the locking position.

The invention claimed is:

1. An adjustable steering column mechanism including:
    a fixed support provided with a fastening interface for fastening to a superstructure of a vehicle;
    a movable subassembly including a tube body and a steering shaft rotating around an axis of rotation in the tube body;
    a connecting articulation for connecting the movable subassembly and the fixed support, to guide pivoting of the movable subassembly relative to the fixed support around a pivot axis fixed relative to the fixed support and perpendicular to the axis of rotation;
    an antitheft locking mechanism including a locking member that is movable relative to the fixed support between a retracted position and at least one locking position and a matching member mounted on the shaft, such that in the locking position, the locking member ensures, with the matching member, positive locking to lock the rotation of the steering shaft around the rotation axis,
    wherein the locking member and the matching member have, in the locking position, a mutual contact zone which, in reference to a direction parallel to the rotation axis, extends on either side of the pivot axis,
    wherein the matching member is connected to the steering shaft via a torque limiter, and
    wherein the antitheft locking mechanism includes an actuator to drive the locking member between the retracted position and the locking position.

2. The steering column mechanism according to claim 1, wherein the locking member is movable between the retracted position and the locking position parallel to a plane containing the axis of rotation.

3. The steering column mechanism according to claim 1, wherein the locking member is translatable along a penetration axis perpendicular to the pivot axis.

4. The steering column mechanism according to claim 1, wherein the locking member is translatable along a penetration axis perpendicular to the rotation axis.

5. The steering column mechanism according to claim 1, wherein the articulation includes two coaxial pivots situated on either side of the steering shaft.

6. The steering column mechanism according to claim 1, wherein the rotation axis and the pivot axis are secant.

7. The steering column mechanism according to claim 1, wherein the steering shaft is a telescopic shaft including at least a first segment and a second segment for supporting a steering wheel, the second segment being translatable relative to the first segment parallel to the rotation axis, the matching member being mounted on the first segment.

8. The steering column mechanism according to claim 7, wherein the first segment is fixed in translation parallel to the rotation axis relative to the fixed support.

9. The steering column mechanism according to claim 1, wherein the locking member includes a curved free end surface.

10. The steering column mechanism according to claim 1, wherein the matching member includes a toothed crown with indentations.

11. The steering column mechanism according to claim 1, wherein the locking member is translatable along a penetration axis perpendicular to the rotation axis and to the pivot axis and the rotation axis and the pivot axis are secant.

12. An adjustable steering column mechanism including:
    a fixed support provided with a fastening interface for fastening to a superstructure of a vehicle;
    a movable subassembly including a tube body and a telescopic steering shaft rotating around an axis of rotation in the tube body, the telescopic steering shaft including at least a first segment and a second segment for supporting a steering wheel, the second segment being translatable relative to the first segment parallel to the rotation axis;
    a connecting articulation for connecting the movable subassembly and the fixed support, to guide pivoting of the movable subassembly relative to the fixed support around a pivot axis fixed relative to the fixed support and perpendicular to the axis of rotation;
    an antitheft locking mechanism including a locking member that is movable relative to the fixed support between a retracted position and at least one locking position and a matching member mounted on the first segment of the telescopic steering shaft, such that in the locking position, the locking member ensures, with the matching member, positive locking to lock the rotation of the steering shaft around the rotation axis,
    wherein the locking member and the matching member have, in the locking position, a mutual contact zone which, in reference to a direction parallel to the rotation axis, extends on either side of the pivot axis.

13. The steering column mechanism according to claim 12, wherein the locking member is movable between the retracted position and the locking position parallel to a plane containing the axis of rotation.

14. The steering column mechanism according to claim 12, wherein the locking member is translatable along a penetration axis perpendicular to the pivot axis.

15. The steering column mechanism according to claim 12, wherein the locking member is translatable along a penetration axis perpendicular to the rotation axis.

16. The steering column mechanism according to claim 12, wherein the articulation includes two coaxial pivots situated on either side of the steering shaft.

17. The steering column mechanism according to claim 12, wherein the rotation axis and the pivot axis are secant.

18. The steering column mechanism according to claim 12, wherein the matching member is connected to the steering shaft via a torque limiter.

19. The steering column mechanism according to claim 12, wherein the first segment is fixed in translation parallel to the rotation axis relative to the fixed support.

20. The steering column mechanism according to claim 12, wherein the antitheft locking mechanism includes an actuator to drive the locking member between the retracted position and the locking position.

21. The steering column mechanism according to claim 12, wherein the locking member includes a curved free end surface.

22. The steering column mechanism according to claim 12, wherein the matching member includes a toothed crown with indentations.

23. The steering column mechanism according to claim 12, wherein the locking member is translatable along a penetration axis perpendicular to the rotation axis and to the pivot axis and the rotation axis and the pivot axis are secant.

24. An adjustable steering column mechanism including:
a fixed support provided with a fastening interface for fastening to a superstructure of a vehicle;
a movable subassembly including a tube body and a steering shaft rotating around an axis of rotation in the tube body;
a connecting articulation for connecting the movable subassembly and the fixed support, to guide pivoting of the movable subassembly relative to the fixed support around a pivot axis fixed relative to the fixed support and perpendicular to the axis of rotation;
an antitheft locking mechanism including a locking member that is movable relative to the fixed support between a retracted position and at least one locking position and a matching member mounted on the shaft, such that in the locking position, the locking member ensures, with the matching member, positive locking to lock the rotation of the steering shaft around the rotation axis,
wherein the locking member and the matching member have, in the locking position, a mutual contact zone which, in reference to a direction parallel to the rotation axis, extends on either side of the pivot axis,
wherein the matching member is connected to the steering shaft via a torque limiter, and
wherein the locking member includes a curved free end surface.

* * * * *